Figure 1:
Figure 1:
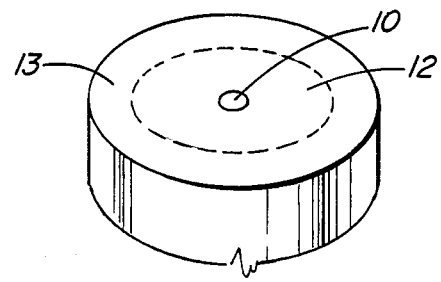

United States Patent [19]
Abe

[11] Patent Number: 4,643,751
[45] Date of Patent: Feb. 17, 1987

[54] METHOD FOR MANUFACTURING OPTICAL WAVEGUIDE

[75] Inventor: Koichi Abe, Ottawa, Canada

[73] Assignee: Northern Telecom Limited, Montreal, Canada

[21] Appl. No.: 745,043

[22] Filed: Jun. 17, 1985

[30] Foreign Application Priority Data

Mar. 19, 1985 [CA] Canada .................................. 476843

[51] Int. Cl.$^4$ ........................................... C03B 37/018
[52] U.S. Cl. ................. 65/3.12; 65/DIG. 16
[58] Field of Search ...................... 65/3.11, 3.12, 3.15, 65/18.2, DIG. 16

[56] References Cited

U.S. PATENT DOCUMENTS

| 3,826,560 | 7/1974 | Schultz | 65/18.1 X |
| 4,289,517 | 9/1981 | Bailey | 65/18.1 X |

FOREIGN PATENT DOCUMENTS

| 2428618 | 2/1980 | France | 65/DIG. 16 |
| 55-67533 | 5/1980 | Japan | 65/DIG. 16 |
| 58-208146 | 12/1983 | Japan | 65/DIG. 16 |
| 59-15090 | 4/1984 | Japan | 65/3.12 |

Primary Examiner—Kenneth M. Schor
Attorney, Agent, or Firm—Schwartz, Jeffery, Schwaab, Mack, Blumenthal & Evans

[57] ABSTRACT

Optical waveguide having a fused silica core and a fluorine doped silica cladding is made by heating a cylinder of silica in fluorine, the cylinder initially having an outer annular particulate or porous region which is dried by the fluorine and into which fluorine diffuses to lower the refractive index of the silica when fused. The cylinder is made by depositing particulate silica onto a mandrel, drying the silica in chlorine, and heating the silica to densify it. Further particulate silica is deposited and is then heated in a fluorine-containing gas to dry, fluorine diffuse, and sinter the porous outer part of the silica. The resulting tubular silica preform is heated to cause fusion of the porous silica and to collapse the tubular preform into a rod from which optical waveguide is drawn, the waveguide having a fluorine doped silica cladding. The fluorine drying and diffusion steps produce HF which is extremely corrosive. To avoid escape of HF, the fluorine drying, diffusion and consolidation steps are all performed within a single protective fused silica tube. After termination of the drying, diffusion and consolidation steps, the protective silica tube is collapsed so as to become an outer layer of the preform and is incorporated within fiber drawn from the preform.

12 Claims, 8 Drawing Figures

METHOD FOR MANUFACTURING OPTICAL WAVEGUIDE

The invention relates to a method for manufacturing optical waveguide. It has particular application to the manufacture of optical waveguide having a fluorine doped silica cladding and a pure or doped silica core.

Optical waveguide having a pure silica core and a fluorine doped silica cladding is described in U.S. Pat. No. 4,082,420 (Shiraishi et al). The optical waveguide is made by a flame hydrolysis method in which silicon tetrachloride and silicon tetrafluoride are fed to an oxygen-hydrogen burner to form a flourine doped silica soot which is deposited onto the surface of a vitreous silica rod. The rod and deposited soot are then heated to consolidate the soot into a composite glass preform and fiber is drawn from the preform.

Using the flame hydrolysis method, it has proven difficult to entrain sufficient fluorine into the deposited silica. The fluorine lowers the refractive index of the silica but the dopant content in the cladding must be sufficient to lower the refractive index of silica from about 1.4585, being that of pure silica, to about 1.455 in order that a fiber having a pure silica core and a doped silica cladding will function as a waveguide.

Our copending Canadian Patent Application Ser. No. 463,378, filed Sept. 17, 1984 (U.S. Ser. No. 721,104, filed Apr. 8, 1985) describes an alternative method of fabricating a fluorine doped silica clad fiber. In the method two cylindrical porous silica preforms are made with dimensions such that one preform will fix axially inside the other. The porous preforms are dried and the larger preform is heated in a fluorine containing atmosphere to introduce a fluorine dopant into it. The smaller preform is then placed inside the larger preform and the two preforms are further dried in, for example, chlorine gas and then heated to consolidate and collapse the porous material of the preforms into a transparent fused silica rod. The composite preform obtained is heated and optical waveguide drawn from it, the waveguide having a pure silica core derived from the smaller preform and a fluorine doped silica cladding derived from the larger preform.

A problem in implementing this method is that when heating to consolidate the porous silica and to collapse the larger porous preform onto the smaller preform, fluorine is released from the outer tube and penetrates into the inner preform thereby undesirably lowering the refractive index of the inner preform.

To avoid this problem there is proposed in our co-pending Canadian patent application Ser. No. 470,963, filed Dec. 21, 1984 (U.S. Ser. No. 745, 779, filed June 17, 1985); a method of manufacturing optical waveguide in which a layer of particulate silica is formed on a cylindrical silica substrate. Fluorine is then diffused into the porous silica layer, and the silica is heated to cause drying, consolidation and collapse of the silica into a fused rod preform. The rod preform is then heated to a drawing temperature and optical waveguide is drawn from the rod preform, such waveguide having a cladding part derived from the deposited particulate silica layer and a core part derived from the substrate silica.

The silica substrate can be prepared by depositing particulate silica onto a cylindrical mandrel, drying the particulate silica and then fusing or densifying the silica. The initally deposited silica is thereby rendered sufficiently dense that when subsequently deposited particulate silica is subjected to fluorine diffusion, either fluorine does not diffuse into the initially deposited silica or it diffuses preferentially into the subsequently deposited silica. The deposited silica forms a tubular preform which is removed from the mandrel at some stage prior to collapsing the silica tube into the fused rod preform.

In an alternative method described in said co-pending application, a relatively dense layer of particulate silica is initially deposited onto the mandrel and is followed by a less dense layer of particulate silica, the relative densities being such that fluorine diffuses readily into the outer layer in comparison to the inner layer.

In a further alternative, the preform is prepared by depositing a thick layer of particulate silica onto a mandrel, drying the silica and then densifying an inner region of the deposited silica before fluorine diffusion takes place. The inner region can, for example, be RF heated using a carbon mandrel as a susceptor.

In yet another alternative described in said co-pending application, the preform is prepared without the use of a mandrel. A fused silica rod is prepared by, for example, fabricating a rod of porous silica, drying and heating the rod to consolidate it into a fused silica rod. Particulate silica is then deposited directly onto the rod and is dried and subjected to fluorine diffusion before consolidation and drawing into fiber.

The particulate silica is preferably produced by a flame hydrolysis action in which silicon tetrachloride dissociates in an oxygen-hydrogen burner flame.

Particulate silica which is to function as core material in the drawn optical waveguide is preferably dried in a chlorine containing atmosphere. In the drying step, chlorine is preferably mixed with helium, a drying chamber being maintained at a temperature of the order of 1300° C. for several hours.

Similarly, particulate silica which eventually is to function as fiber cladding can also be dried in chlorine before being subjected to the fluorine diffusion step. Alternatively, it is dried in a fluorine atmosphere whereby it is simultaneously subjected to the drying and fluorine diffusion steps. In the fluorine diffusion step, the fluorine containing gas, for example sulphur hexafluoride or silicon tetrafluoride, is mixed with helium in an amount dependent on the refractive index value required of the fused silica finally obtained.

In an improvement of the method described in said co-pending patent application, the fluorine drying, diffusion and ensuing consolidation steps are performed in a protective glass tube such as a fused silica tube. The silica tube is then heated to its softening point whereupon it collapses down onto the consolidated fluorine doped silica. In the fluorine drying step, highly corrosive HF is produced which attacks the inside surface of the protective glass tube liner. However the wall thickness of the tube is sufficiently great that in the period required to fluorine dry, diffuse and consolidate the porous silica, the tube remains intact and does not permit escape of HF from the tube. By maintaining the preform in the tube the risk of preform contamination attendant on preform transfer during these steps the chance of contamination from vessel to vessel is removed.

An embodiment of the invention will now be described, by way of example, with reference to the accompanying drawings in which:

FIG. 1 shows the end part of an optical waveguide made by a method according to the invention, the Figure also illustrating a refractive index profile across the fiber; and FIGS. 2 to 8 are schematic views of stages in the manufacture of optical waveguide by one method according to the invention.

Referring to FIG. 1, an optical fiber has a core 10 of high purity fused silica, a cladding 12 of fluorine doped silica, and a silica jacket 13. The optical fiber has an outer diameter of 125 microns and a core diameter of 9 microns for single mode fiber and about 50 microns for multimode fiber. The fluorine is present in an amount sufficient that the refractive index of the cladding region is 1.455 or less compared to 1.4585 for the core region.

To make a fiber having the structure and composition shown in FIG. 1, a cylindrical preform is made from particulate silica. The preform is dried and fluorine is diffused into an outer porous region of the preform. The preform is then consolidated into a fused silica rod from which fiber is drawn, the fiber having a relatively low refractive index cladding corresponding to the fluorine doped region.

Referring particularly to FIGS. 2 to 8, FIG. 2 shows a tubular fused silica support tube 14, 50 centimeters in length with an internal diameter of 4 millimeters and an external diameter of 6 millimeters. The ends of the silica support tube are fixed into spaced chucks 17 of a lathe. A silica soot producing burner 18 is mounted to direct a flame at the support tube 14. Silicon tetrachloride entrained within a stream of oxygen by bubbling the oxygen through the silicon tetrachloride is fed to a central tubular chamber within the burner 18. Argon, which separates the silicon tetrachloride vapour from the burner gases within the burner itself is fed to a second surrounding annular chamber, hydrogen to a third annular chamber, and a mixture of argon and oxygen is fed to an outer burner chamber. The flow rates are 2 to 3 litres per minute of oxygen to the first chamber, 2 litres per minute of argon to the second chamber, 10 litres per minute of hydrogen to the third chamber and 15 litres per minute of argon with 3 litres per minute of oxygen to the outer chamber. The burner is moved along the length of the support tube at 8 centimeters per minute and the support tube 14 is rotated at 30 revolutions per minute.

Particulate core silica is deposited onto the support tube 14 to a diameter of 1.2 centimeters and at a rate of growth which depends on the diameter of the support tube as supplemented by previously deposited particulate silica.

The deposited silica has a very high moisture content. This is untenable if the silica is to be incorporated within an optical waveguide since the moisture results in a large absorption peak near 1400 nanometers which affects the transmission at 1300 and 1500 nanometers which are the output wavelengths of long wavelength light emitting devices of interest in fiber optic communications systems.

Figure 3:
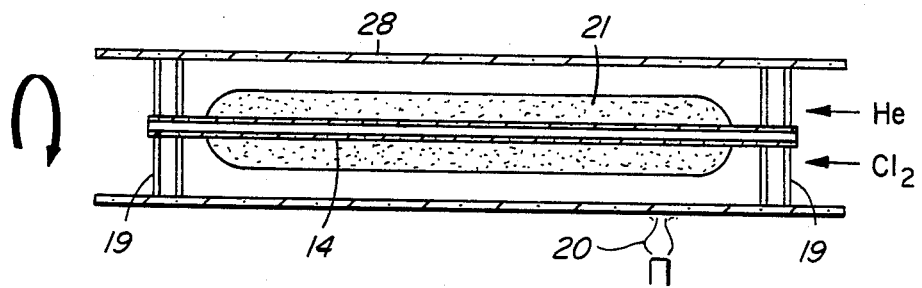

To remove this OH moisture absorption peak, the particulate silica is dried in a chlorine-containing atmosphere at high temperature. As shown in FIG. 3 the preform 21 is mounted within a 16 millimeter internal diameter silica tube 28 using apertured TEFLON (Trade Mark) spacers 19 which permit the silica preform and the tube 28 to be rotated with the preform 21 held centrally in the tube. A mixture of chlorine (200 cubic centimeters per minute) and helium (200 cubic centimeters per minute) is then piped through the tube and a burner flame 20 is directed at the outside of the tube to establish a temperature of 1300° C. at a hot zone of the porous tubular silica preform 21. The torch is passed several times along the tube in the direction of flow of the gas mixture. Torch traversal takes place at 8 centimeters per minute for a time of 60 minutes. During this period the porous silica shrinks to about 0.9 centimeters in diameter corresponding to a soot densification from an initial value of about 0.35 grams $cm^{-3}$ to a final amount of about 0.8 grams $cm^{-3}$. Hydrogen contained within the soot as the hydroxyl species OH radical combines with the chlorine to produce volatile hydrogen chloride and is removed. Excess chlorine and hydrogen chloride are exhausted from the tube leaving only chlorine within the particulate silica. Removal of hydroxyl species renders subsequently formed fused silica very highly transmissive.

In a subsequent sintering or consolidation step, the burner traversal rate is reduced to 0.2 centimeters per minute and the gas applied to the burner is altered to obtain a hot zone temperature of about 1600° C. After a one hour burner traversal period, the soot is consolidated to a fused silica tube 27 about 30 centimeters in length having an external diameter of 0.65 centimeters.

Figure 2:
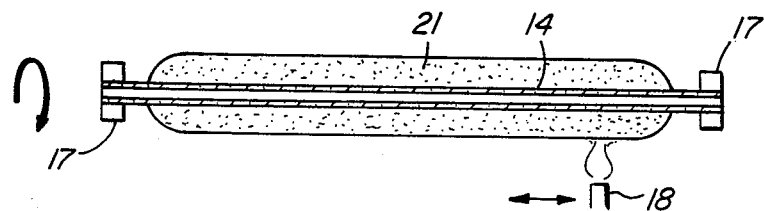
Figure 4:
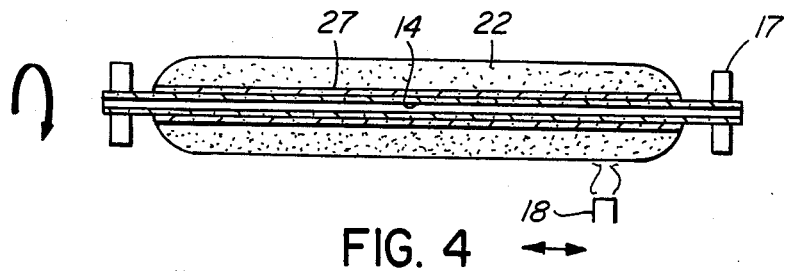

Referring to FIG. 4, the silica tube 14 is mounted between quartz chucks 17 and further silica soot 22 is deposited from a burner 18 similar to that described with reference to FIG. 2. The soot 22 is deposited to a diameter of 2.4 centimeters with a density of 0.35 grams $cm^{-3}$.

Figure 5:
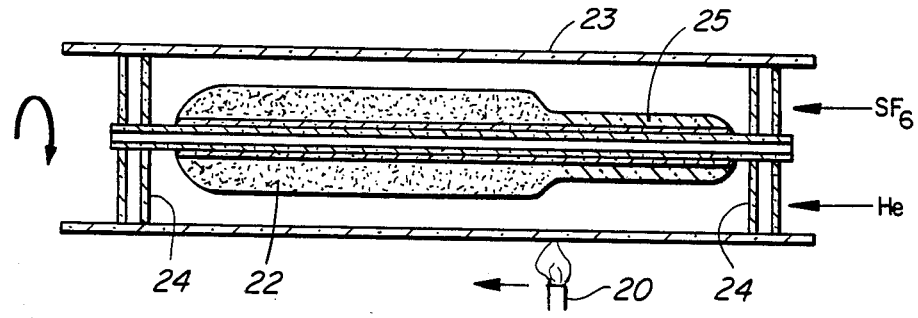

When silica deposition is complete, the silica tube is placed within a protective fused silica tube 23 having an inside diameter of 2.8 centimeters and a 1 millimeter wall thickness (FIG. 5). The tube is mounted between apertured Teflon discs 24 which permit tube rotation. The porous silica 22 is then simultaneously dried and doped with fluorine by passing along the tube 23 a mixture of helium (180 cubic centimeters per minute) and sulphur hexafluoride (45 cubic centimeters per minute). A single burner pass is made in the direction of gas flow at a traversal rate of 0.4 centimeters per minute and a hot zone temperature in the range 1450° to 1550° C. Because of the presence of fluorine in the porous silica, the sintering temperature is much lower than that of pure silica. Consequently the heat pass not only dries and dopes the silica but causes sintering as shown at region 25. A fused silica tube is produced having an external diameter of 1.1 centimeter. An outer annular region of the tube is doped with fluorine to a level at which the refractive index is 1.4520 compared to 1.4585 of the pure silica in the central region. The refractive index difference of 0.0065 is suitable for making multimode optical waveguide.

Although it is convenient to perform the drying and fluorine doping steps simultaneously, the steps can in fact be performed successively in which case an alternative drying agent such as chlorine can be used. By using the chlorine and fluorine drying techniques at various stages in the fabrication process, a moisture level of less than 0.1 parts per million in the fused silica is achieved.

Figure 6:
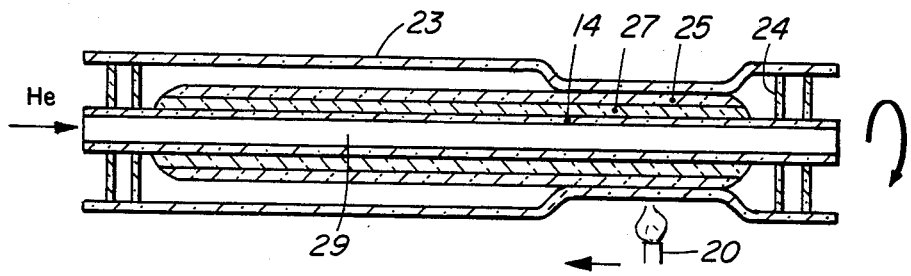
Figure 7:
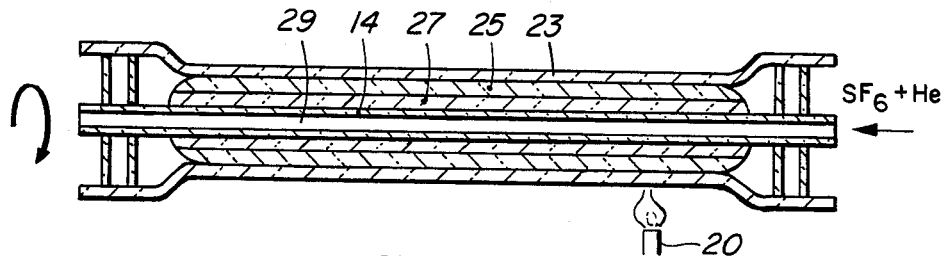
Figure 8:

As indicated previously, the fluorine drying method produces highly corrosive HF which is flushed from the tube by the incoming sulphur hexafluoride-helium mixture. While the HF is within the tube, it corrodes the tube inside surface. To avoid the tube wall being broached with consequent escape of highly corrosive HF vapour, the tube is only used in the production of a few preforms. Thus in selected process runs, after the porous silica 22 has been sintered, the temperature of the hot zone is raised to about 1800° C. at which the silica tube 23 softens and collapses onto the fluorine doped silica region 25 (FIG. 6). The diameter of the preform tube is increased from about 1 centimeter to about 1.5 centimeters. The composite preform obtained has a small bore 29 through its center. As shown in FIG. 7, a mixture of sulphur hexafluoride and helium in the volume ratio 10%:90% is then passed down bore 29. At the same time, the preform is subjected to a number of passes of the burner 20 at about 1 centimeter per minute to establish a temperature at the center of the preform of about 1200° C. At this temperature the silica of the initial support tube 14 is etched away. To accurately gauge the amount of material removed and to prevent the removal of deposited core silica, the preform is periodically weighed or the cross-section is optically monitored. Once the initial support tube 14 has been fully etched away, the composite tubular preform is collapsed by heating to a temperature in the range 1850° to 1900° C. and traversing the burner at 1 centimeter per minute towards the inlet end while maintaining a clean helium atmosphere in the bore 29. The wall can be still further thickened by mounting the preform in a lathe as described with reference to FIG. 2 and depositing and sintering silica soot as described with reference to FIG. 3.

The rod preform obtained is subsequently placed in a vertical orientation drawing tower (not shown) having a furnace zone at which the preform temperature is raised to about 2000° C. which is higher than the silica softening point. Fiber is pulled from the lower end of the preform (FIG. 8) by a drum (not shown) onto which the fiber is wound after being cooled and coated with a protective acrylate or silicone layer. The fiber has a high purity silica core, a relatively low refractive index fluorine doped silica cladding and a silica jacket.

The waveguide produced using this method is multimode fiber having a core diameter of about 50 microns, a cladding diameter of about 75 microns, and an overall diameter of 125 microns. As previously indicated the refractive index difference is approximately 0.007. Monomode fiber, in contrast has a smaller core of the order of 9 microns in diameter and a refractive index difference of approximately 0.0035. To modify the method for monomode fiber, the core diameter is reduced. One way of achieving this is merely by depositing more silica soot at the stage described with reference to FIG. 4. Another method is to etch the internal wall bounding the bore through the tubular preform obtained after etching out support tube 14 using a fluorine-containing etchant. A refractive index difference of the order of 0.0035 is achieved by doping the porous silica to a lower level by increasing the ratio of helium in the helium:sulphur hexafluoride mixture used during the fluorine drying/doping stage of FIG. 5. The amount of fluorine necessary to lower the refractive index of silica to 1.452 is about the limiting level at which fluorine can be incorporated into silica using this method. To obtain a refractive index difference larger than 0.007 for a silica based fiber, the refractive index of the core can be increased above the value of that of the pure silica by introducing a refractive index raising dopant material into the silica initially deposited onto the mandrel 14. Germanium can be included within the silica initially deposited by entraining germanium tetrachloride with silicon tetrachloride injected into the soot producing burner 18.

As an alternative to the embodiment of the invention described, the silica soot which eventually forms the cladding material can be formed by flame hydrolysis of a mixture of silicon tetrafluoride and silicon tetrachloride. Using this method, some fluorine is entrained during deposition of particulate silica and is then supplemented during the fluorine diffusion step.

As an alternative to a tubular silica support tube, a carbon mandrel can be used, the preform being removed from the mandrel after deposition and drying of core silica but before sintering thereof.

What is claimed is:

1. A method of manufacturing optical waveguide comprising depositing a layer of particulate silica on a cylindrical silica substrate, positioning said silica substrate covered with particulate silica into a protective fused silica tube, heating the protective silica tube and the substrate contained therein and passing a fluorine containing gas through the tube to dry and diffuse fluorine into the particulate silica, consolidating the particulate silica on said substrate and collapsing said protective silica tube onto the consolidated particulate silica to form a fused silica rod, heating the rod to a drawing temperature, and drawing optical waveguide from the rod preform, such waveguide having a fluorine doped silica cladding part derived from the deposited silica layer, a core part derived from the substrate silica, and an outer jacket part derived from the protective silica tube.

2. A method as claimed in claim 1 in which the silica substrate is prepared by depositing particulate silica onto a cylindrical mandrel, drying the particulate silica and then heating the particulate silica to render it sufficiently dense that fluorine does not diffuse into the substrate silica when it diffuses into the subsequently deposited silica.

3. A method as claimed in claim 2 in which the silica deposited on the mandrel forms a tubular preform from which the mandrel is removed prior to collapse of the silica into a fused rod.

4. A method as claimed in claim 1 in which particulate silica is produced by the flame hydrolysis of silicon tetrachloride.

5. A method as claimed in claim 1 in which the particulate silica is dried in a chlorine atmosphere.

6. A method as claimed in claim 2 in which both the substrate silica and the subsequently deposited silica are dried in a chlorine atmosphere.

7. A method as claimed in claim 1 in which particulate silica is dried in a fluorine atmosphere.

8. A method as claimed in claim 1 in which fluorine is derived from one of the group of gases consisting of sulphur hexafluoride and silicon tetrafluoride.

9. A method as claimed in claim 2 in which prior to consolidation of the porous silica layer, the mandrel is removed leaving the silica structure as a tubular preform.

10. A method as claimed in claim 2 in which the mandrel is a fused silica rod which is retained within the drawn fiber as a filament in the core thereof.

11. A method as claimed in claim 2 in which the mandrel is a silica support tube, the tube being etched away prior to collapse of the silica into the fused rod.

12. A method of manufacturing optical waveguide comprising:
depositing a first layer of particulate silica on a cylindrical mandrel;
drying the particulate silica;

consolidating the particulate silica;

removing the silica from the mandrel as a first silica tube;

depositing a second layer of particulate silica on the first silica tube;

drying, fluorine doping and consolidating the second layer of particulate silica within a surrounding protective silica tube by passing a fluorine containing gas through the protective tube while heating the protective tube;

heating the protective silica tube, second layer of particulate silica and first silica tube to cause collapse thereof to a fused rod; and heating the rod to a drawing temperature and drawing optical waveguide from the rod, such waveguide having a core derived from the first layer of silica, a cladding derived from the second layer of silica, and an outer part derived from the protective silica tube.

* * * * *